US006374998B1

(12) United States Patent
Grubbs et al.

(10) Patent No.: US 6,374,998 B1
(45) Date of Patent: Apr. 23, 2002

(54) "ACCELERATION CONVEYOR"

(75) Inventors: Michael R. Grubbs, Nashville; Garry R. Kenny, College Grove, both of TN (US)

(73) Assignee: Advanced Sorting Technologies LLC, Nashville, TN (US)

( * ) Notice: Subject to any disclaimer, the term of this patent is extended or adjusted under 35 U.S.C. 154(b) by 0 days.

(21) Appl. No.: 09/302,707

(22) Filed: Apr. 29, 1999

(51) Int. Cl.[7] .............................................. B65G 15/00

(52) U.S. Cl. .................................................. 198/836.2

(58) Field of Search ................................ 209/587, 638, 209/639, 900; 198/836.1, 836.2; 271/3.23, 12, 197, 202

(56) References Cited

U.S. PATENT DOCUMENTS

| | | | | |
|---|---|---|---|---|
| 1,035,345 A | | 8/1912 | Heess | |
| 1,464,885 A | * | 8/1923 | Slocomb | 198/836.2 |
| 1,547,743 A | | 7/1925 | Fowle | |
| 1,847,263 A | | 3/1932 | Sandberg | |
| 1,847,265 A | | 3/1932 | Sandbeg | |
| 2,897,952 A | | 8/1959 | Buccicone | |
| 3,101,832 A | | 8/1963 | Wyle et al. | |
| 3,185,286 A | | 5/1965 | Koplin r | |

(List continued on next page.)

FOREIGN PATENT DOCUMENTS

| | | |
|---|---|---|
| CA | 2109021 | 4/1994 |
| DE | 3615644A 1 | 11/1987 |
| DE | 3828067 A1 | 2/1990 |
| DE | 3926641 | 2/1991 |
| DE | 3926641 A1 | 2/1991 |
| DE | 4125045 A1 | 2/1993 |
| DE | 4135394 A1 | 4/1993 |
| DE | 4305006 A1 | 9/1993 |
| DE | 4241990 C2 | 6/1994 |
| DE | WO 96/06690 | 3/1996 |
| EP | 291 959 A2 | 11/1988 |
| EP | 873797 | 4/1998 |
| RU | 1411228 | 7/1988 |
| SU | 1050992 | 10/1983 |

OTHER PUBLICATIONS

Catalog of Magnetic Separtion Systems, Inc. entitled "Systems for Separation and Sensing" (undated, but admitted to be prior art).

Brochure entitled "MSS Pen Binary Bottlesort®" (Undated, but admitted to be prior art).

Brochure entitled "MSS Plasticsort®" (Undated, but admitted to be prior art).

Brochure entitled "Machinefabriek Lubo® Mobile Systems" (Undated, but admitted to be prior art) discloses a screening unit having rotating discs on parallel shafts.

Brochure entitled "Machinefabriek Lubo® Projects" (Undated, but admitted to be prior art) discloses a screening unit having rotating discs on parallel shafts.

*Primary Examiner*—Tuan N. Nguyen
(74) *Attorney, Agent, or Firm*—Waddey & Patterson; Lucian Wayne Beavers

(57) ABSTRACT

A paper handling system includes an acceleration conveyor having an acceleration belt operating at an acceleration speed. The system includes a pinning structure operably positioned to pin paper to the acceleration belt. The pinning structure is a rotary feeder which includes a plurality of flexible bristles extending radially from a roller into engagement with the acceleration belt. The speed of the acceleration belt is sufficiently high to create a suction phenomena such that when paper is pinned to the acceleration belt with the rotary feeder, the paper will be accelerated to a paper speed substantially equal to the acceleration speed. The system also includes a blower system operative to facilitate carrying the paper off of the acceleration belt across a transition gap between the acceleration belt and a product belt.

9 Claims, 14 Drawing Sheets

U.S. PATENT DOCUMENTS

| | | | | | |
|---|---|---|---|---|---|
| 3,198,352 | A | | 8/1965 | Puechberty | |
| 3,227,263 | A | | 1/1966 | Kastenbein | |
| 3,352,404 | A | | 11/1967 | Settembrini | |
| 3,471,013 | A | | 10/1969 | Haver | |
| 3,603,645 | A | | 9/1971 | Hardy | |
| 3,650,369 | A | | 3/1972 | Vergobbi | |
| 3,747,755 | A | | 7/1973 | Senturia et al. | 209/111.5 |
| 3,800,936 | A | | 4/1974 | Anfossi | |
| 3,908,814 | A | | 9/1975 | Hieronymus | 198/34 |
| 4,069,145 | A | | 1/1978 | Sommer, Jr. et al. | |
| 4,093,062 | A | | 6/1978 | Sjögren | |
| 4,094,772 | A | | 6/1978 | Hillekamp et al. | 2009/12 |
| 4,102,056 | A | | 7/1978 | Angelo et al. | |
| 4,124,168 | A | | 11/1978 | Bialski et al. | 241/14 |
| 4,131,540 | A | | 12/1978 | Husome et al. | |
| 4,163,550 | A | * | 8/1979 | Armstrong | 198/836.2 X |
| 4,176,750 | A | | 12/1979 | Holmes | |
| 4,207,177 | A | | 6/1980 | Block | 209/44.2 |
| 4,225,427 | A | | 9/1980 | Schnell | 209/44.1 |
| 4,231,526 | A | | 11/1980 | Ortner et al. | 241/28 |
| 4,352,430 | A | | 10/1982 | Maier et al. | |
| 4,440,284 | A | | 4/1984 | DeWoolfson | 194/4 R |
| 4,505,371 | A | | 3/1985 | Krueger et al. | |
| 4,533,053 | A | | 8/1985 | Kenny et al. | 209/636 |
| 4,533,054 | A | | 8/1985 | Sommer, Jr. et al. | 209/687 |
| 4,541,530 | A | | 9/1985 | Kenny et al. | 209/571 |
| 4,542,689 | A | | 9/1985 | Trolle | 100/215 |
| 4,609,108 | A | * | 9/1986 | Hristozov et al. | 209/639 X |
| 4,632,320 | A | | 12/1986 | Holz et al. | 241/46.17 |
| 4,657,144 | A | | 4/1987 | Martin et al. | |
| 4,699,510 | A | | 10/1987 | Alguard | |
| 4,718,559 | A | | 1/1988 | Kenny et al. | 209/571 |
| 4,760,925 | A | | 8/1988 | Stehle et al. | 209/616 |
| 4,844,351 | A | | 7/1989 | Holloway | 241/19 |
| 4,909,930 | A | | 3/1990 | Cole | |
| 4,919,534 | A | | 4/1990 | Reed | |
| 4,929,342 | A | | 5/1990 | Johnston | 209/12 |
| 5,022,644 | A | | 6/1991 | Burge | |
| 5,024,335 | A | | 6/1991 | Lundell | 209/618 |
| 5,048,674 | A | | 9/1991 | Wilbur et al. | |
| 5,060,870 | A | | 10/1991 | Trezek et al. | 241/19 |
| 5,085,325 | A | | 2/1992 | Jones et al. | |
| 5,091,077 | A | | 2/1992 | Williams | 209/12 |
| 5,092,526 | A | | 3/1992 | Takata | |
| 5,100,005 | A | | 3/1992 | Noble et al. | 209/583 |
| 5,100,537 | A | | 3/1992 | Krause | 209/2 |
| 5,101,977 | A | | 4/1992 | Roman | 209/3 |
| 5,111,927 | A | | 5/1992 | Schulze, Jr. | 194/209 |
| 5,115,144 | A | | 5/1992 | Konishi et al. | |
| 5,115,987 | A | | 5/1992 | Mithal | 241/23 |
| 5,143,308 | A | | 9/1992 | Hally et al. | 241/76 |
| 5,150,307 | A | | 9/1992 | McCourt et al. | |
| 5,165,676 | A | | 11/1992 | Blessing et al. | 271/273 |
| 5,169,588 | A | | 12/1992 | Estepp | 264/331.17 |
| 5,183,251 | A | | 2/1993 | Sardella | |
| 5,190,165 | A | | 3/1993 | Garfield, Jr. | 209/655 |
| 5,197,678 | A | | 3/1993 | Trezek et al. | 241/21 |
| 5,201,921 | A | | 4/1993 | Luttermann et al. | 8/506 |
| 5,209,355 | A | | 5/1993 | Mindermann | 209/3.1 |
| 5,257,577 | A | | 11/1993 | Clark | 100/99 |
| 5,297,667 | A | | 3/1994 | Hoffman et al. | 198/492 |
| 5,299,693 | A | | 4/1994 | Ubaldi et al. | 209/3.3 |
| 5,301,816 | A | | 4/1994 | Weber et al. | 209/616 |
| 5,314,072 | A | | 5/1994 | Frankel et al. | 209/44.1 |
| 5,315,384 | A | | 5/1994 | Heffington et al. | |
| 5,318,172 | A | | 6/1994 | Kenny et al. | 209/524 |
| 5,322,152 | A | | 6/1994 | Tommila et al. | 194/212 |
| 5,333,739 | A | | 8/1994 | Stelte | |
| 5,333,797 | A | | 8/1994 | Becker et al. | 241/19 |
| 5,335,791 | A | | 8/1994 | Eason | |
| 5,339,962 | A | | 8/1994 | Sommer, Jr. et al. | 209/576 |
| 5,339,963 | A | | 8/1994 | Tao | |
| 5,344,026 | A | | 9/1994 | Booth et al. | |
| 5,348,136 | A | | 9/1994 | Kenney et al. | 198/443 |
| 5,348,162 | A | | 9/1994 | Wroblewski | 209/35 |
| 5,361,913 | A | | 11/1994 | Melchionna | 209/583 |
| 5,398,818 | A | | 3/1995 | McGarvey | |
| 5,402,264 | A | | 3/1995 | Wilbur et al. | |
| 5,419,438 | A | | 5/1995 | Squyres et al. | |
| 5,431,289 | A | * | 7/1995 | Hoffman | 209/639 X |
| 5,440,127 | A | | 8/1995 | Squyres | |
| 5,443,164 | A | | 8/1995 | Walsh et al. | |
| 5,445,369 | A | * | 8/1995 | Golicz et al. | 271/12 X |
| 5,460,271 | A | | 10/1995 | Kenny et al. | 209/576 |
| 5,464,981 | A | | 11/1995 | Squyres et al. | |
| 5,469,973 | A | | 11/1995 | Booth et al. | |
| 5,481,864 | A | | 1/1996 | Wright | |
| 5,497,871 | A | | 3/1996 | Ciolkevich | 198/443 |
| 5,501,344 | A | | 3/1996 | Kaiser et al. | |
| 5,512,758 | A | | 4/1996 | Kobayashi et al. | |
| 5,531,331 | A | | 7/1996 | Barnett | |
| 5,533,628 | A | | 7/1996 | Tao | |
| 5,555,984 | A | | 9/1996 | Sommer, Jr. et al. | |
| 5,632,381 | A | | 5/1997 | Thust et al. | |
| 5,675,416 | A | | 10/1997 | Campbelll et al. | |
| 5,695,035 | A | | 12/1997 | Fukushima et al. | |
| 5,789,741 | A | | 8/1998 | Kinter et al. | |
| 5,794,788 | A | | 8/1998 | Massen | |
| 5,797,327 | A | | 8/1998 | Gleser et al. | |
| 5,799,105 | A | | 8/1998 | Tao | |
| 5,799,801 | A | | 9/1998 | Clark et al. | 209/667 |
| 5,813,542 | A | | 9/1998 | Cohn | |
| 5,848,706 | A | | 12/1998 | Harris | |
| 5,862,919 | A | | 1/1999 | Eason | |
| 5,884,775 | A | | 3/1999 | Campbell | |
| 5,901,856 | A | | 5/1999 | Brantley, Jr. et al. | 209/672 |
| 5,917,585 | A | | 6/1999 | Roe et al. | 356/73 |
| 5,954,206 | A | | 9/1999 | Mallon et al. | |
| 5,960,964 | A | | 10/1999 | Austin et al. | 209/672 |
| 5,966,217 | A | | 10/1999 | Roe et al. | |
| 5,979,240 | A | | 11/1999 | Rix et al. | |
| 6,022,017 | A | | 2/2000 | Cummings et al. | |
| 6,060,677 | A | | 5/2000 | Ulrichsen et al. | |
| 6,064,056 | A | | 5/2000 | Doak | 250/233 |
| 6,076,684 | A | | 6/2000 | Bollegraaf | 209/668 |
| 6,137,074 | A | | 10/2000 | Doak | 209/581 |

* cited by examiner

"ACCELERATION CONVEYOR"

BACKGROUND OF THE INVENTION

The present invention relates to paper handling. Select embodiments of the invention are particularly well-suited for use in the waste paper recycling industry.

Environmental campaigns and recycling in many offices have generated a supply of recyclable waste paper. However, waste paper sorting is still currently performed almost entirely by manual sorting. This is time consuming and expensive. Thus, heretofore it has generally been more economical to use raw paper material than sort and process recyclable waste paper.

Numerous automated waste separation techniques are known. However these systems are designed for recovery of non-ferrous metals, aerospace alloys, municipal waste, mixed recyclables and plastic containers. Paper sorting presents unique problems not overcome by prior art separation techniques.

The unique problems encountered when attempting to sort waste paper is due to the relatively light weight and flexible nature of pieces of paper. These characteristics make it difficult to supply paper to a sorting sensor. Even when waste paper has been supplied to a sensor, it has not been supplied at a sufficient feed rate, e. g. pieces per hour (PPH), to be cost effective. Prior art sensors operate on the basis of an eddy current created by the waste stream as it passes through the sensor, diffusion of light transmission through the waste e. g. transparent glass, and the like. These techniques are inapplicable to sorting waste paper because the paper has no metallic components and the paper is opaque to light. Thus, not only must an effective paper sorting sensor be designed, an effective paper handling system must be designed to supply waste paper in sufficient feed rates to the effective paper sorting sensor. Prior art paper handling techniques have been unsatisfactory in overcoming these obstacles.

SUMMARY OF THE INVENTION

The present invention relates to paper handling and sorting methods and devices.

A paper handling system includes an acceleration conveyor including an acceleration belt operating at an acceleration speed. A pinning structure is operably positioned to pin paper to the acceleration belt. The pinning structure may be a rotary feeder positioned above the acceleration belt. The rotary feeder includes a plurality of flexible bristles extending radially from a roller and contacting the surface of the acceleration belt. The speed of the acceleration belt is sufficiently high to create a suction phenomena such that when a sheet of paper is pinned in close contact to the acceleration belt, it will be accelerated to a paper speed substantially equal to the acceleration speed.

In another embodiment, the paper handling system includes an acceleration conveyor adapted to feed paper to a device at a predetermined speed. A product conveyor is located downstream of the acceleration conveyor. A transition gap is located between the acceleration conveyor and the product conveyor. A blowing system is operatively positioned to facilitate carrying the paper across the transition gap at a speed substantially equal to the speed at which the paper is moving on the acceleration conveyor.

Accordingly an object of the present invention is to provide means and methods for achieving a cost effective recycled machine grade paper fraction from a paper waste stream.

Another object of the present invention is to provide means for achieving automated sortation on a cost effective basis.

Another object of the present invention is to provide means for achieving improved consistency and repeatability in the quality of recycled waste paper.

Another object is to reduce labor requirements for sorting waste paper.

Another object of the present invention is to provide means and methods to accelerate and spread paper to operably thin layers to achieve an effective sort.

A further object of the present invention is to perform the sort at high speeds.

An object of the present invention is to incorporate automated sortation into a paper handling system to achieve consistent grades of premium paper from waste paper.

Other and further objects, features and advantages of the invention will be readily apparent to those skilled in the art upon a review of the following disclosure when taken in conjunction with the accompanying drawings.

BRIEF DESCRIPTION OF THE DRAWINGS

FIG. 3 shows the spreader in its preferred inclined orientation.

FIG. 7 shows the spreader in an optional non-inclined orientation. Clumps of paper are shown being fed into the product input and accelerated downstream. An end-on view of three sets of rotatable shafts, which are rotating at increasing speeds, is shown.

DESCRIPTION OF THE PREFERRED EMBODIMENTS

Figure 1:
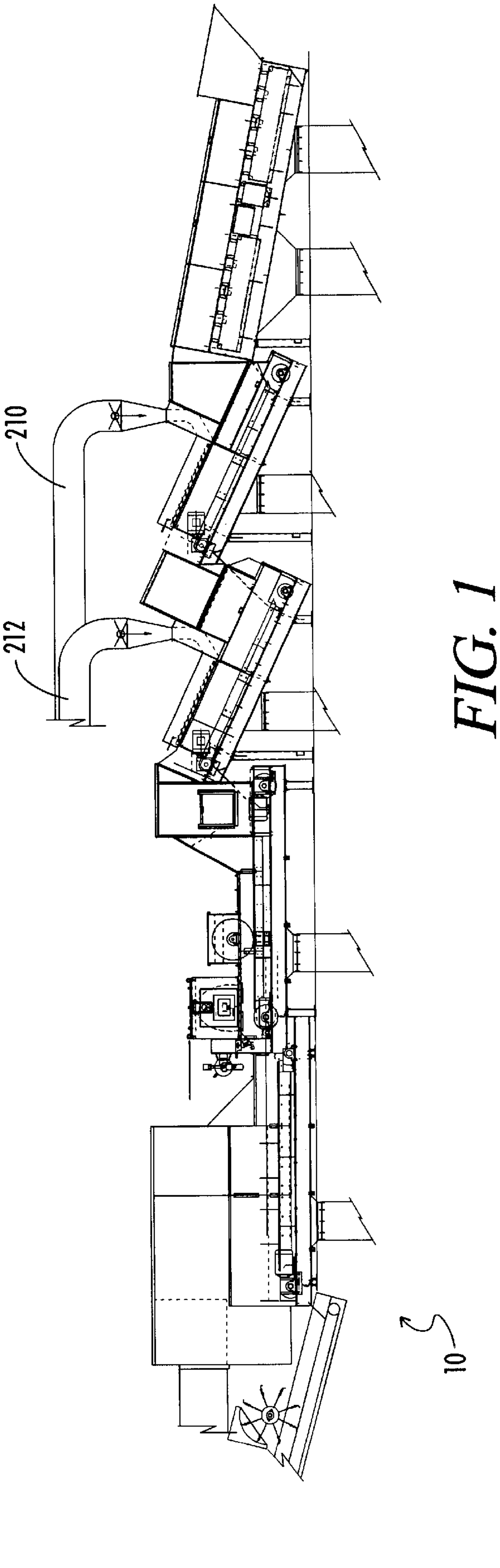
FIG. 1 shows a paper sorting system according to the present invention.

The present invention relates to methods and apparatus for handling, in particular sorting, paper. The invention will be best understood by reference to the attached drawings wherein like reference numerals refer to like components.

Figure 2:
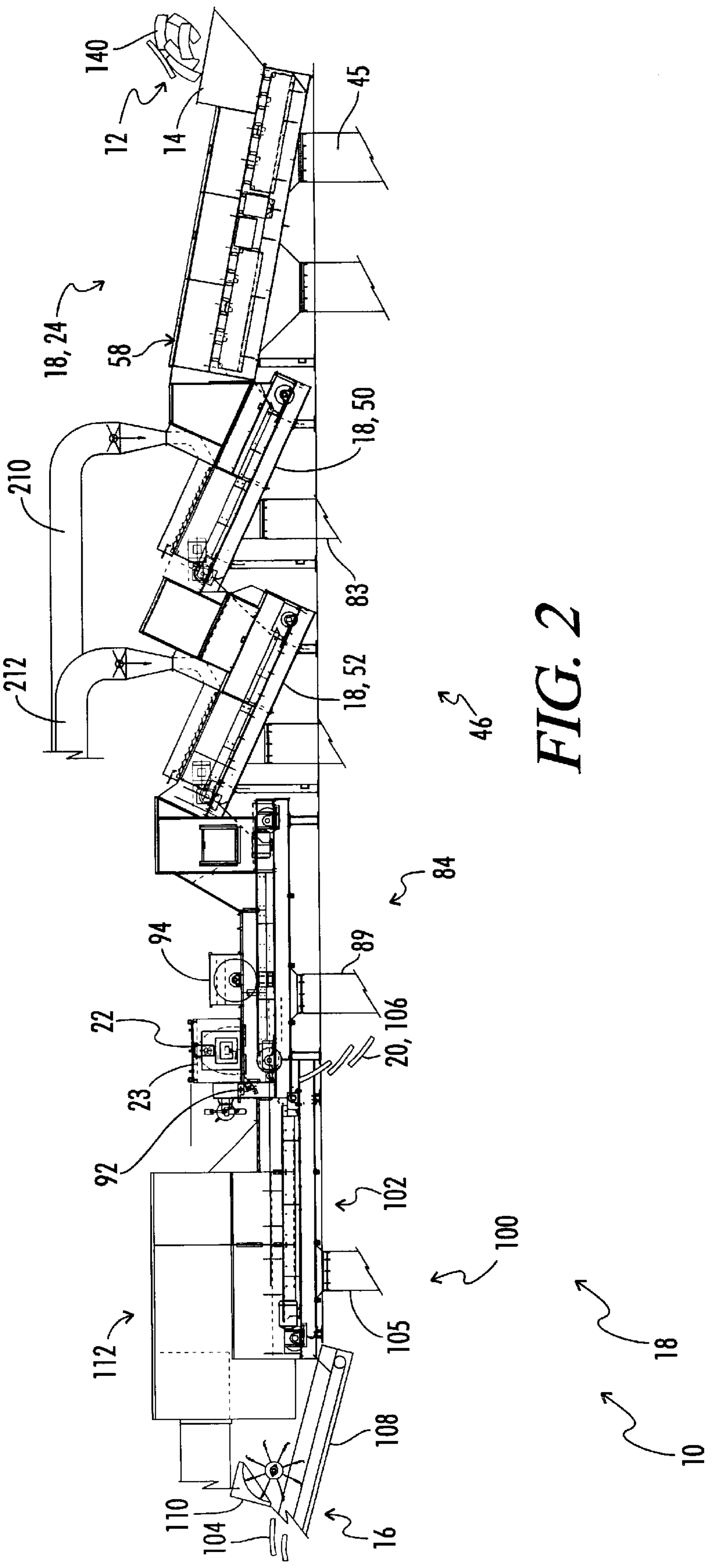
FIG. 2 depicts the system shown in FIG. 1 receiving clumps of paper, ejecting targeted paper, and delivering product.

FIG. 1 shows an elevated side view of one embodiment of the present invention for a paper handling or sorting system 10. Referring to FIG. 2, the paper handling system 10 is adapted to handle paper 12 fed into the system. The system 10, in the embodiment shown in FIG. 2, comprises a paper input 14 adapted to receive the paper 12, and a product output 16. The system 10 includes acceleration means 18 for distributing and accelerating the paper 12. The acceleration means 18 is operably positioned between the paper input 14 and the product output 16. As is further explained below, the acceleration means 18 includes several separate components including spreader 26, inclined conveyors 50 and 52, and acceleration conveyor 84.

In some embodiments, the system 10 comprises an ejection output 20 between the paper input 14 and the product output 16. A sensor means 22 for determining whether paper should be routed to the ejection output 20 or the product output 16 is included in the system 10 shown in FIG. 2. Generally the acceleration means 18 accelerates the paper 12 from a first speed proximate the paper input 14 to a second higher speed proximate sensor means 22.

In some embodiments the paper 12 is fed from a pit conveyor (not shown) to the paper input 14 at a rate of ten to thirty feet per minute. This may be via a lift conveyor (not shown) which transfers mixed waste paper from the pit conveyor to the paper input 14.

In order to effectively eject sensed target paper, it is important that the paper 12 pass through the sensor means 22 at a predetermined speed. The sensor means 22 includes a sensor 23. In some embodiments the predetermined speed at which the paper 12 passes through the sensor 23 is 1000 or 1200 feet per minute. One goal is to accelerate the paper 12 from a first speed at which it enters the system 10 to a greater speed and pass it through the sensor at the greater speed. Thus, the paper may be accelerated from 10 ft./min. to 1200 ft./min.

Another goal is to spread and separate the paper in order to achieve a more effective and efficient sort. Thus, in one embodiment the acceleration means includes the spreading means or spreader 24 for distributing and spreading paper 12. The paper 12 generally enters the system in clumps at the paper input 14.

The Spreader

Figure 3:
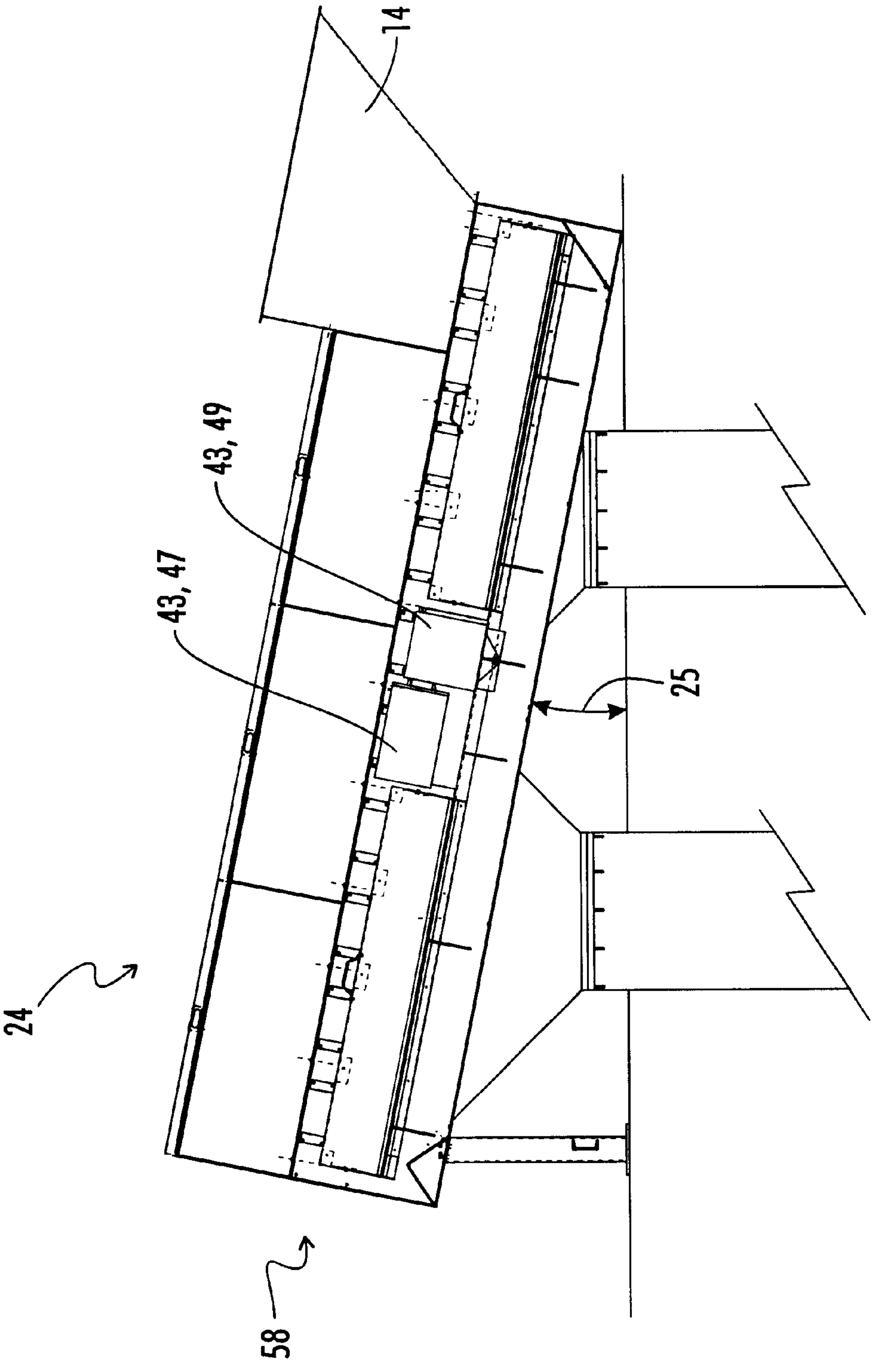
FIG. 3 depicts an elevated side view the spreader included in FIG. 1. A paper input is shown on the right and discharge chutes depend from the spreader.
Figure 4:
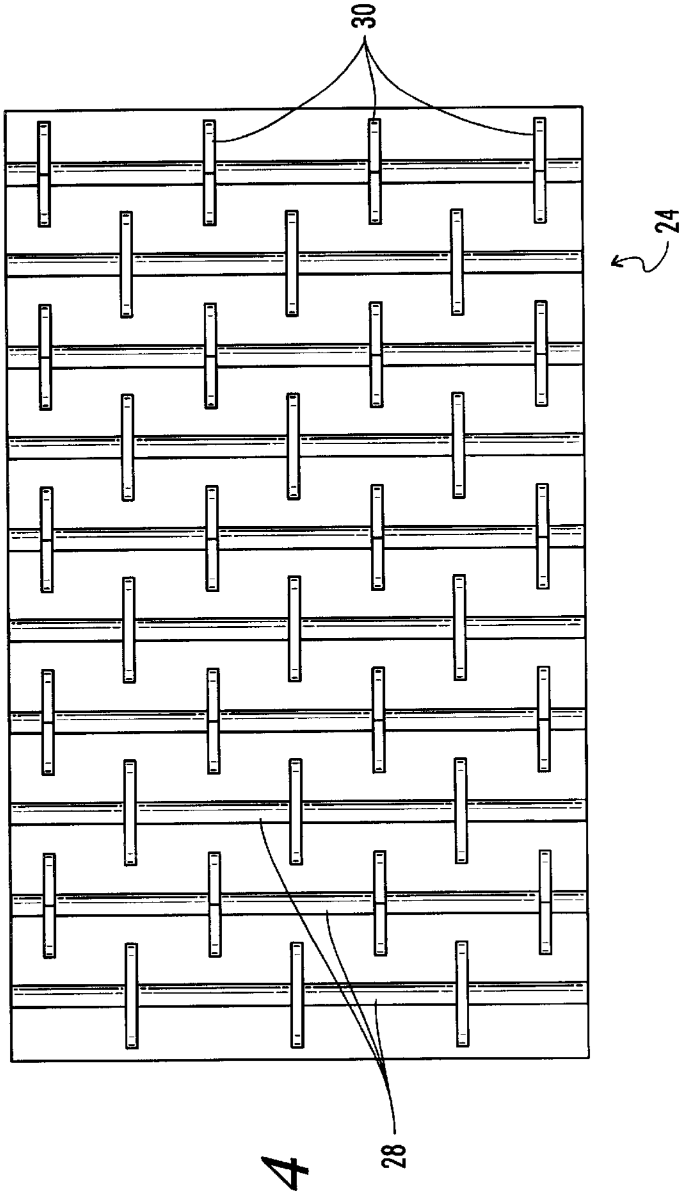
FIG. 4 shows a simplified schematic plan view of the spreader shown in FIG. 3 with the paper input removed. A plurality of rotatable shafts including a plurality of discs on each shaft is depicted. The discs are oriented at zero degrees and forty-five degrees on alternating shafts.

FIG. 3 shows an elevated side view of the spreader 24 shown in FIG. 2. FIG. 4 shows a simplified or schematic plan view of the spreader 24 shown in FIG. 3. In the embodiment of FIG. 3, the spreader 24 is shown in its preferred inclined orientation with the frame and thus the paper flow path being at an angle 25 which is in the range of 10° to 20°, and is preferably in the range of 14° to 16°. The spreader 24 includes a plurality of rotatable shafts 28. Each rotatable shaft 28 includes a plurality of discs 30.

Figure 5:
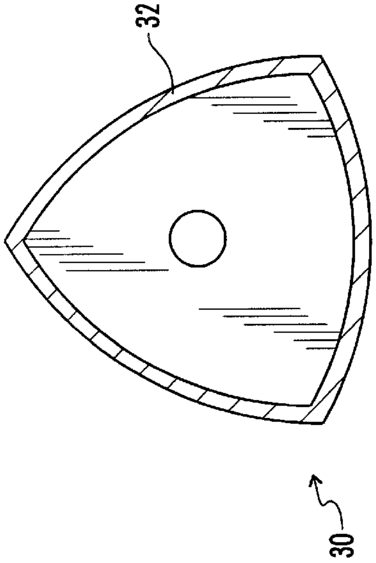
FIG. 5 depicts an elevated side view of a rubber tipped disc. The disc is shown oriented at zero degrees.

FIG. 5 shows an elevated side view of a disc 30. In the embodiment shown in FIG. 5 the disc 30 is a bulged triangular disc which includes rubber tips or edges 32. Other effective disc configurations will be apparent to those with skill in the art. The rubber tip 32, which is urethane in one preferred embodiment, helps grip the paper 12 and accelerate paper 12 which is contacting the discs 30 ahead of other paper 12 not yet contacting the discs 30. Other disc friction enhancing embodiments will be apparent to those with skill in the art.

Figure 6:
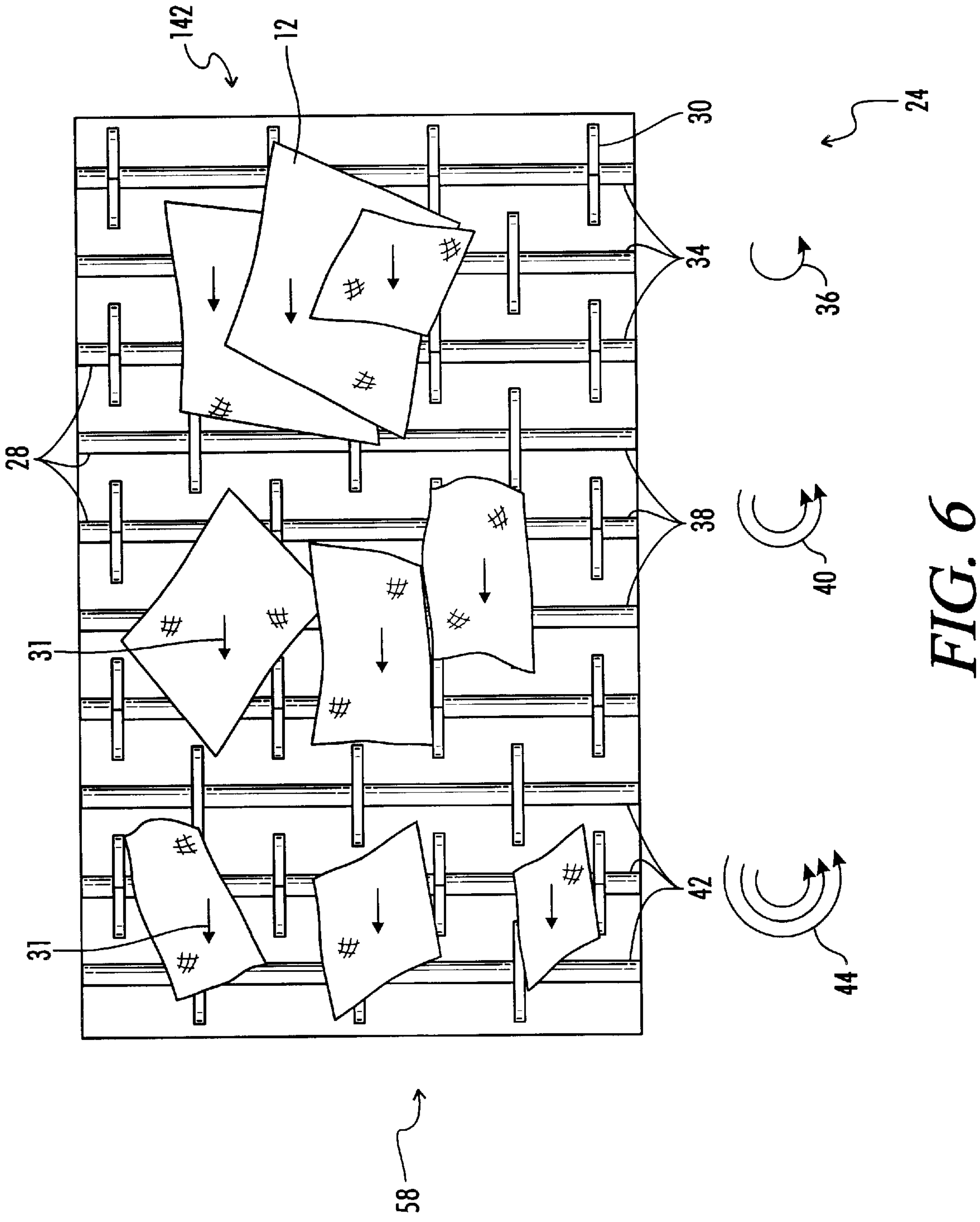
FIG. 6 depicts a plan view of the spreader shown in FIG. 4 wherein three sets of the rotatable shafts are rotated at progressively increasing speeds. Clumps of paper are shown being fed and accelerated on the rotatable shafts.
Figure 7:
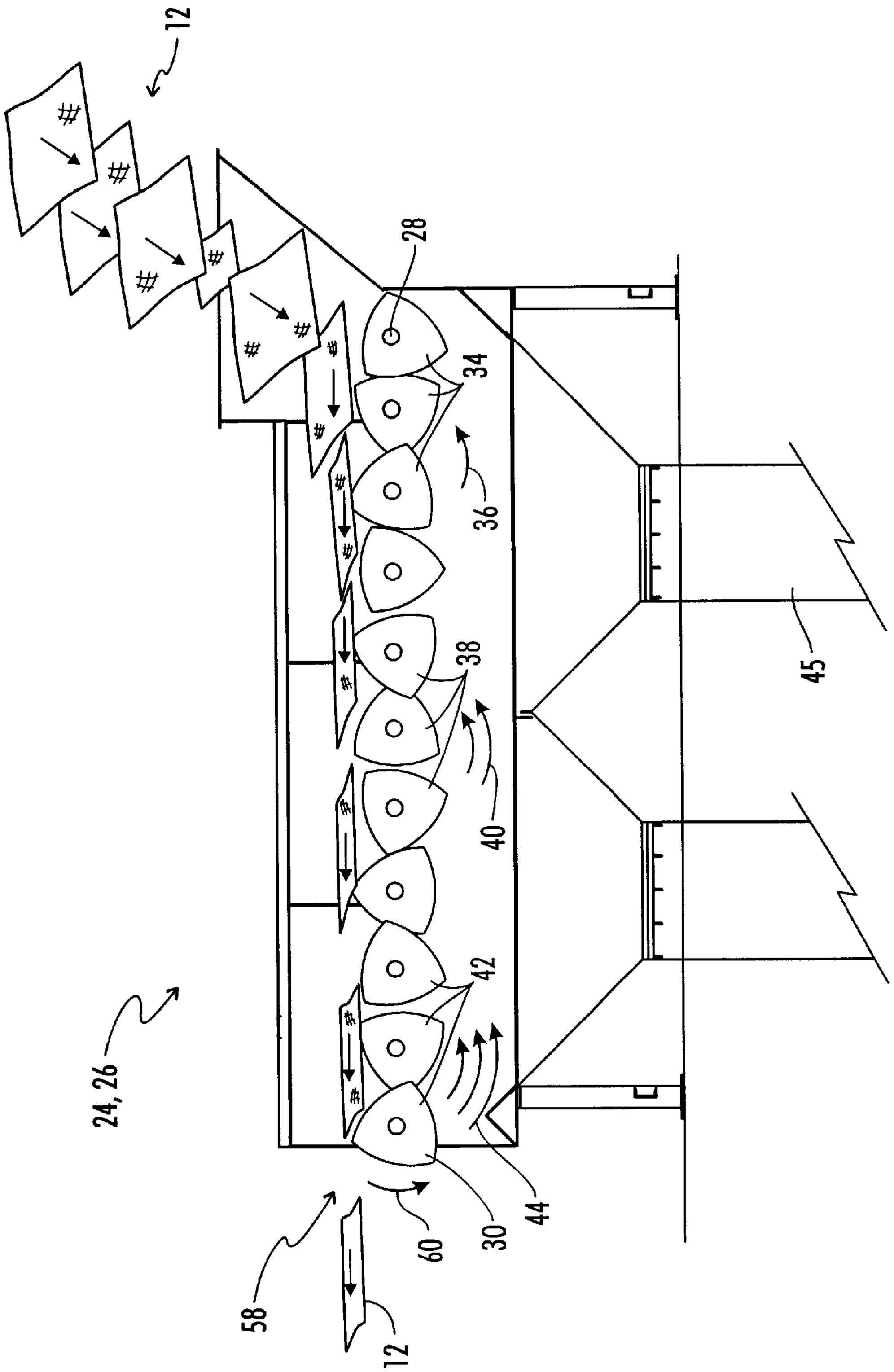
FIG. 7 shows a somewhat schematic elevated side view of the spreader shown in FIG. 3.
Figure 8:
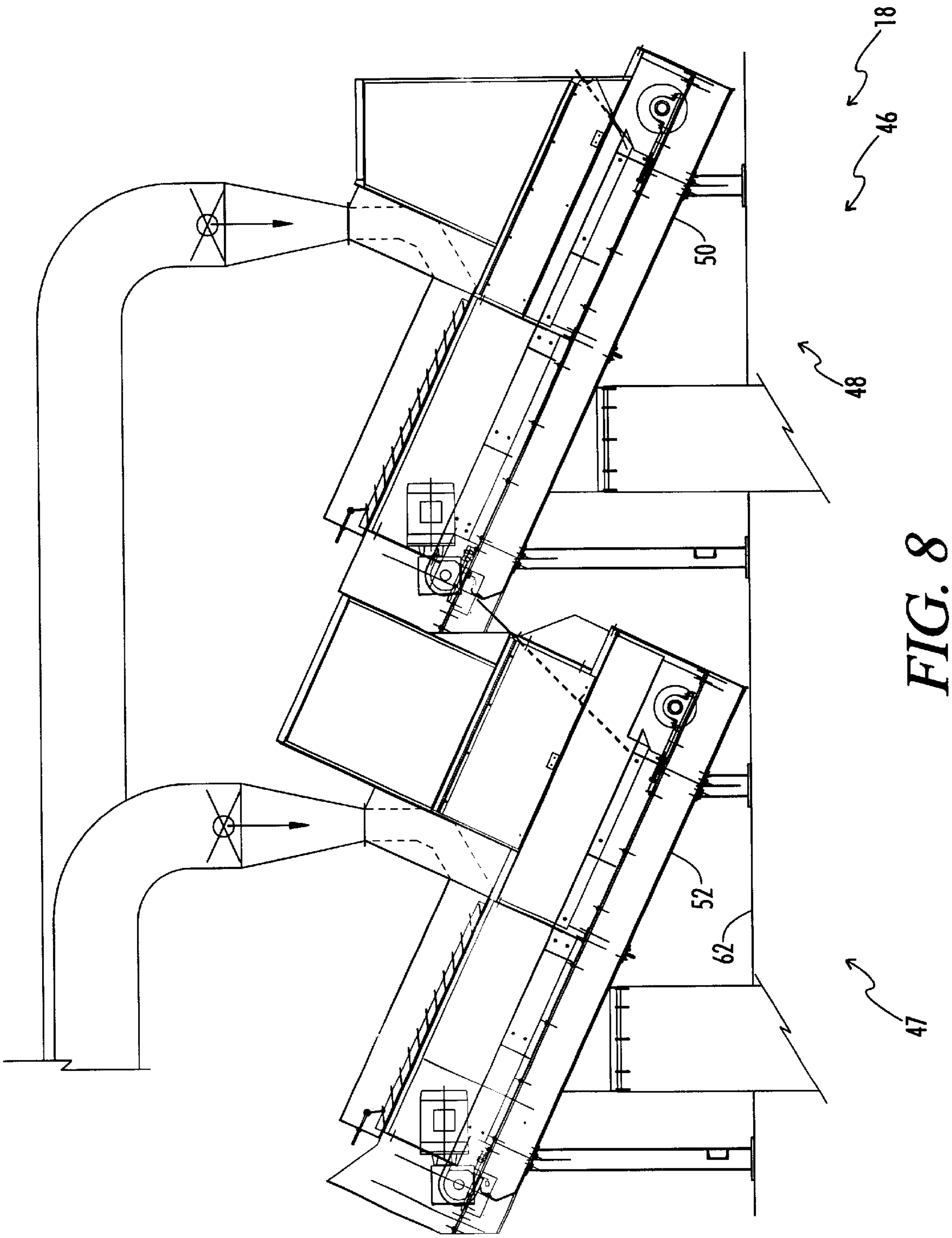
FIG. 8 shows an enlarged view of the two inclined conveyors included in FIG. 1. The first inclined conveyor is positioned to feed into the second inclined conveyor.

As noted, FIGS. 4, 6 and 7 are somewhat schematic illustrations of the arrangement of the disc 30. FIG. 7 illustrates an alternative orientation of spreader 24 in a non-inclined position. Although the spreader 24 will operate successfully in the non-inclined position of FIG. 7, it has been found to be preferable to incline spreader 24 as shown in FIG. 3. The inclination of the spreader aids in the separation and spreading of the paper, as it allows top layers to slide back over bottom layers.

In actual construction, the discs 30 are typically formed from one-quarter inch thick urethane sheet material. Adjacent discs are typically separated by a spacer plate (not shown) having a thickness on the order of one to two inches.

FIGS. 6 and 7 show plan and elevated side views, respectively, of the spreader 24 in which paper 12 is spread and accelerated by the rotatable shafts 28 and discs 30.

The plurality of rotatable shafts 28 comprise bulged triangular discs 30. The bulged triangular discs 30 are rotated 45 degrees relative to the remainder of the bulged triangular discs 30. As shown in FIG. 6 every other shaft includes a point of the disc 30 projecting out of the page. This is shown in FIG. 7 as well.

FIG. 6 shows paper 12 flowing downstream in the direction of arrows 31 from the paper input 14 toward the product output 16. Downstream is defined as the direction from the paper input 14 toward the product output 16. As shown in FIG. 6, the plurality of rotatable shafts 28 are generally transverse to the flow of paper 12.

The triangular shaped discs 30 function to vibrate and undulate the paper stream as it flows across discs 30. This is accomplished by the tips of the discs 30 impacting the paper stream at regular time intervals between impacts as the paper travels downstream.

FIG. 7 shows an elevated side view of the spreader 24. The plurality of shafts 28 comprises at least two sets of shafts including a first set of shafts 34 operating at a first speed 36. The first speed 36 is indicated by the rotation arrows shown in FIGS. 6 and 7. The plurality of shafts 28 also includes a second set of shafts 38 operating at a second speed 40. As shown in FIGS. 6 and 7, the second speed 40 is higher than the first speed 36. This is indicated by use of an increased number of rotation arrows for increased speeds. Also depicted in FIGS. 6 and 7 is a third set of shafts 42 operating at a third speed 44.

In one embodiment the first 34, the second 38, and the third 42 set of shafts rotate at progressively increasing speeds. In one embodiment the first set of rotatable shafts 34 rotates at a tip speed of approximately 155 feet per minute; the second set of rotatable shafts 38 rotate at a tip speed of approximately 280 feet per minute; and the third set of rotatable shafts 42 operate at a tip speed of approximately 386 feet per minute.

These progressively increasing speeds of the first, second and third sets of shafts are accomplished by a drive means 43 including a drive motor 47 driving a gear box 49 which in turn is drivingly connected to one of the shafts 28 (see FIG. 3). The various shafts each carry two sprockets (not shown) on their outer ends, and the sprockets of adjacent shafts are connected by drive chains (not shown). The desired relative speeds of the various shafts are controlled by the selection of the size of the sprockets attached to each shaft. Thus if it is desired to double the speed of one shaft relative to the adjacent shaft, the two shafts carry sprockets one of which has twice the number of teeth as the other, the two sprockets being connected by a chain.

Undersized material will fall between the shafts 28 and discs 30. Removable canvas chutes 45 direct this undersized material to bins (not shown). Thus, the spreader 24 also functions as a trommel, or a sifter.

The Inclined Conveyors

Referring to FIG. 2 the acceleration means 18 includes a plurality of inclined conveyors 50 and 52 located downstream of the spreader 24.

Figure 9:
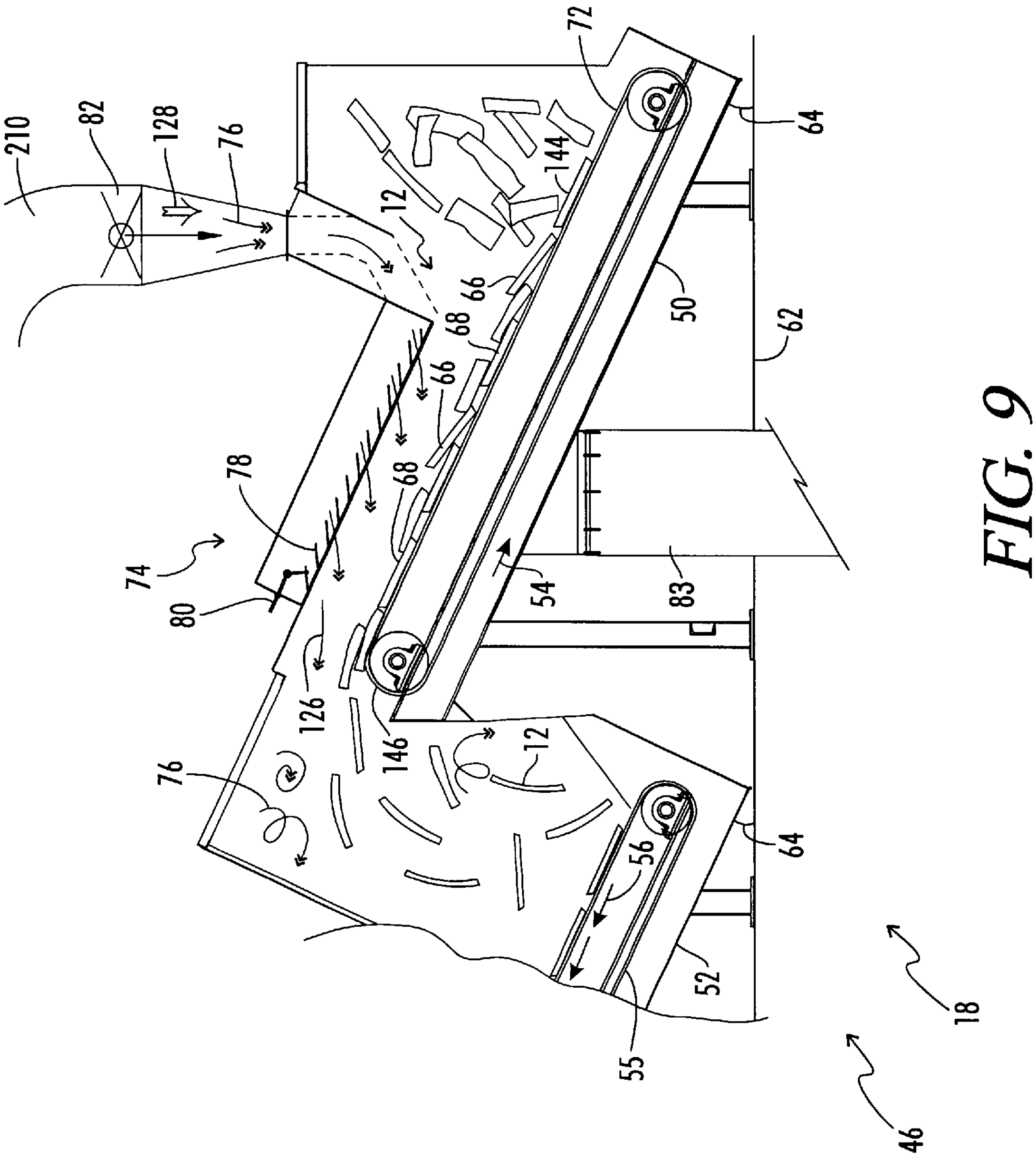
FIG. 9 shows a simplified enlarged view of the first inclined conveyor shown in FIG. 8. The first inclined conveyor is shown accelerating underlying layers of paper and feeding the paper to the second inclined conveyor. Air supplied through a set of louvers pins the paper to the inclined conveyor belt and fluffs, and further spreads, the paper as it cascades off of the end of the first inclined conveyor.

FIG. 9 shows a schematic enlarged view of the inclined conveyors 50 and 52. In FIG. 9 the first inclined conveyor 50 operates at a first inclined conveyor speed 54. The second inclined conveyor 52 operates at a second inclined conveyor speed 56. Preferably the second inclined conveyor speed 56 is higher than the first inclined conveyor speed 54. The increase in speed from one conveyor to another facilitates spreading, thinning, and acceleration of the paper 12.

FIG. 7 shows an embodiment wherein the spreader 24 comprises a spreader output 58. Proximate to the spreader output 58, the spreader 24 operates at an output speed 60. Preferably the first inclined conveyor speed 54 is higher than the spreader output speed 60. The speed at which the paper travels downstream is thus progressively increased.

Typically the first and second inclined conveyors 50 and 52 are inclined, relative to a horizontal floor 62, at an angle 64 in the range of ten degrees to thirty-five degrees (10° to 35°). The incline of the conveyors provides means for top layers of paper 66 to slide off of bottom layers of paper 68. This further spreads the paper into thinner layers. Preferably the inclination angle 64 of first and second inclined conveyors 50 and 52 is about twenty-five degrees (25°).

Preferably the conveyor 50 comprises a belt 70 including rough top material 72. In some embodiments, the conveyor belting is vulcanized seamless rough top rubber material. The rough top material 72 helps grip the bottom layers of paper 68 and accelerate them to a speed substantially equivalent to the speed of the inclined conveyor belt. The material further helps to spread the bottom layers of paper 68 apart from the top layers of paper 66. The bottom layers of paper 68 are being pulled or carried along the belt 70 at a greater speed than the top layers of paper 66, while the top layers of paper 66 slide down off of the bottom layers of paper 68 due to gravity. Other conventional belting material to effectuate objectives of the present invention will be apparent to those of skill.

In some embodiments the inclined conveyor 50 comprises a belt 70 and assist means 74. The assist means 74 is for pinning the paper 12 to the belt 70. In the embodiment shown in FIG. 9, air 76 flows through a set of louvers 78 positioned above the belt 70. The air flows downward against paper 68 to assist in pinning paper 68 to belt 70. The louvers 78 may be adjusted, opened, closed, or oriented, by a louver handle 80. They may be automatically adjusted as well as manually adjusted. The air 76 is controlled through an air knife 82.

Also the air assist means 74 provides a means for fluffing the paper as it cascades off the first inclined conveyor 50 onto the second inclined conveyor 52.

Any paper which adheres to of conveyor 50 and carries over the discharge end thereof will be directed to canvas chute 83 which transfers material from a drop-out opening to container on the floor. It is noted that each of the conveyors described herein has close fitting sidewalls enclosing it on each side, so that paper cannot fall off the side of the conveyor.

In some embodiments the inclined conveyors will have variable frequency drives.

Provisions may be made for a portion of sidewalls of a conveyor to be removable for replacement of the belting. Access/ports for cleaning out jams that might occur at transfer points between conveyors may be incorporated. Viewing windows may be provided to allow material flow to be observed during operations.

In some embodiments a uniform, metered feed stream of waste paper will be accepted from a typical input feed system. Multiple stages of high-speed rough-top inclined conveyors may be positioned in series to accelerate and distribute the in feed waste paper as it is being transported to an automated sensing/ejection system.

It is important to note that components of the paper handling system need not be aligned in a straight line as shown in FIG. 2. It will be apparent to those with skill in the art that bends and angles may be incorporated where appropriate. Intermediate transport or delivery conveyors may be incorporated where appropriate as well.

The Acceleration Conveyor and Product Conveyor

Figure 10:
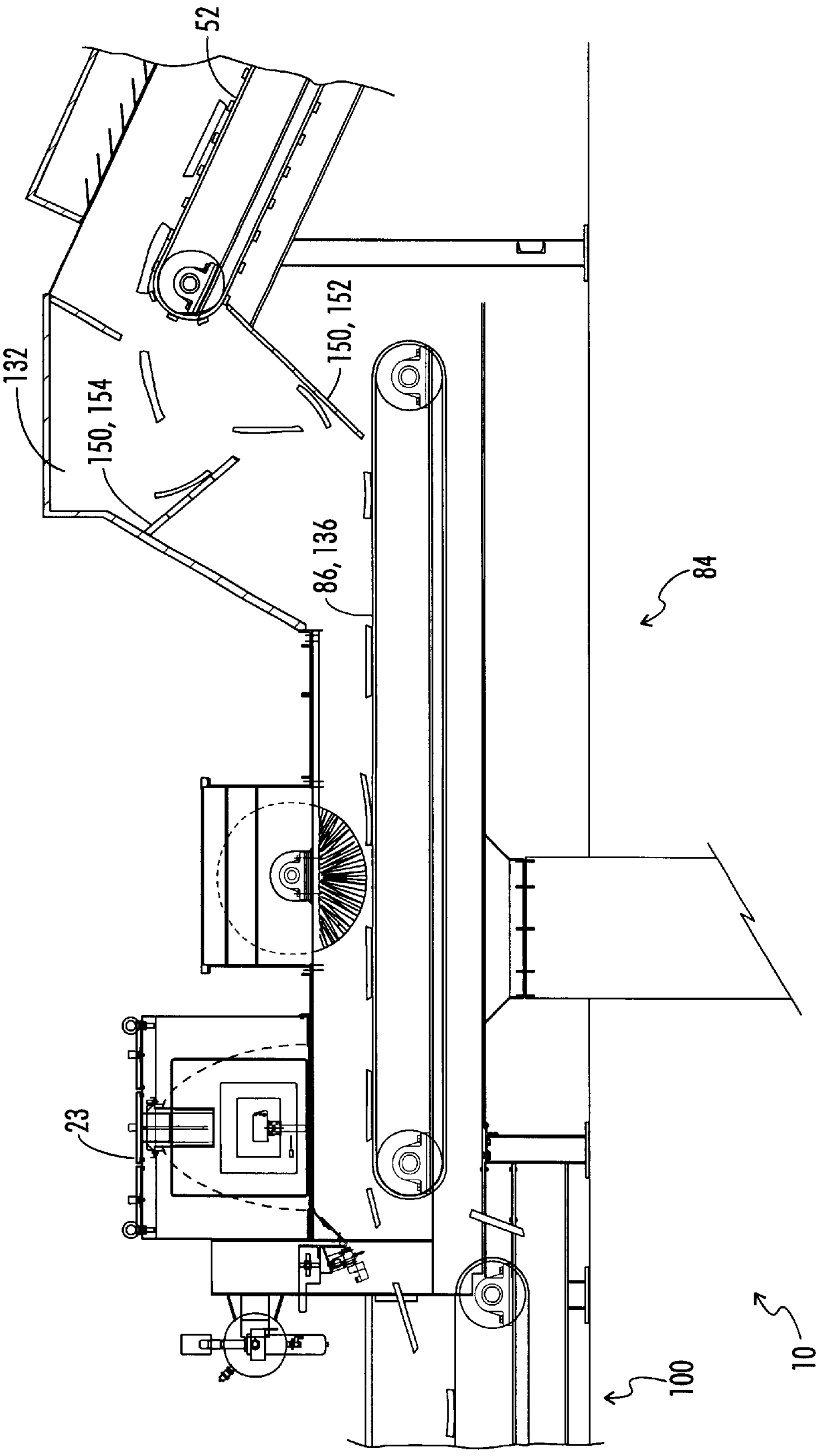
FIG. 10 depicts an enlarged view of the acceleration conveyor, sensor and product conveyor shown in FIG. 1.

The system 10 shown in FIG. 2 comprises an acceleration conveyor 84, which may also be referred to as a feed means 84 for feeding the paper 12 at a predetermined speed to the sensor means 22, 23. The acceleration conveyor 84 is positioned downstream of the inclined conveyors 50 and 52. FIG. 10 shows an enlarged elevated side view of the feed means 84. In one embodiment the second conveyor 52 operates at an inclined conveyor speed which is slower than the predetermined speed at which the paper 12 is fed to the sensor 22, 23.

Figure 11:
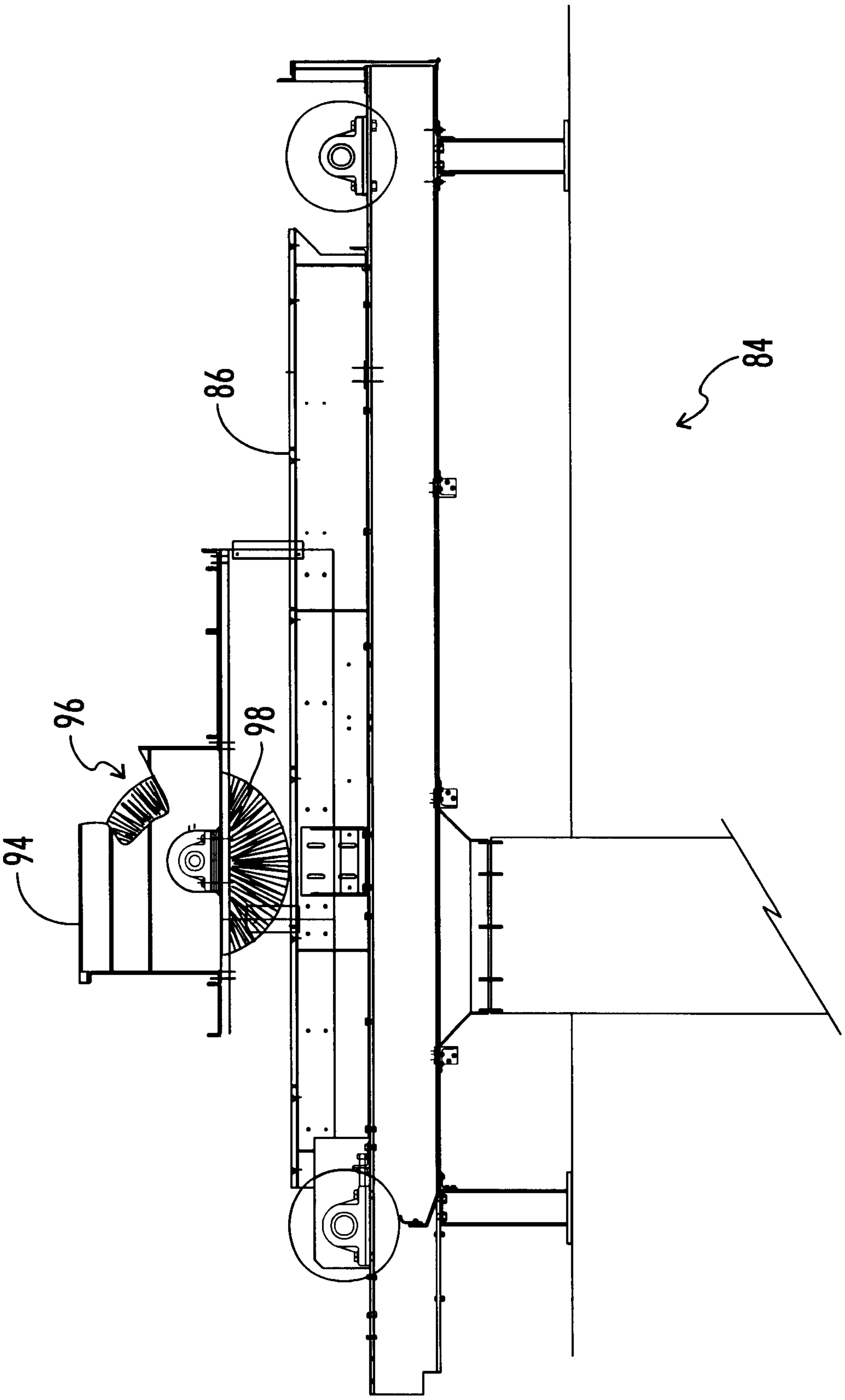
FIG. 11 depicts the acceleration conveyor of FIG. 10 without the sensor and without the product conveyor.
Figure 12:
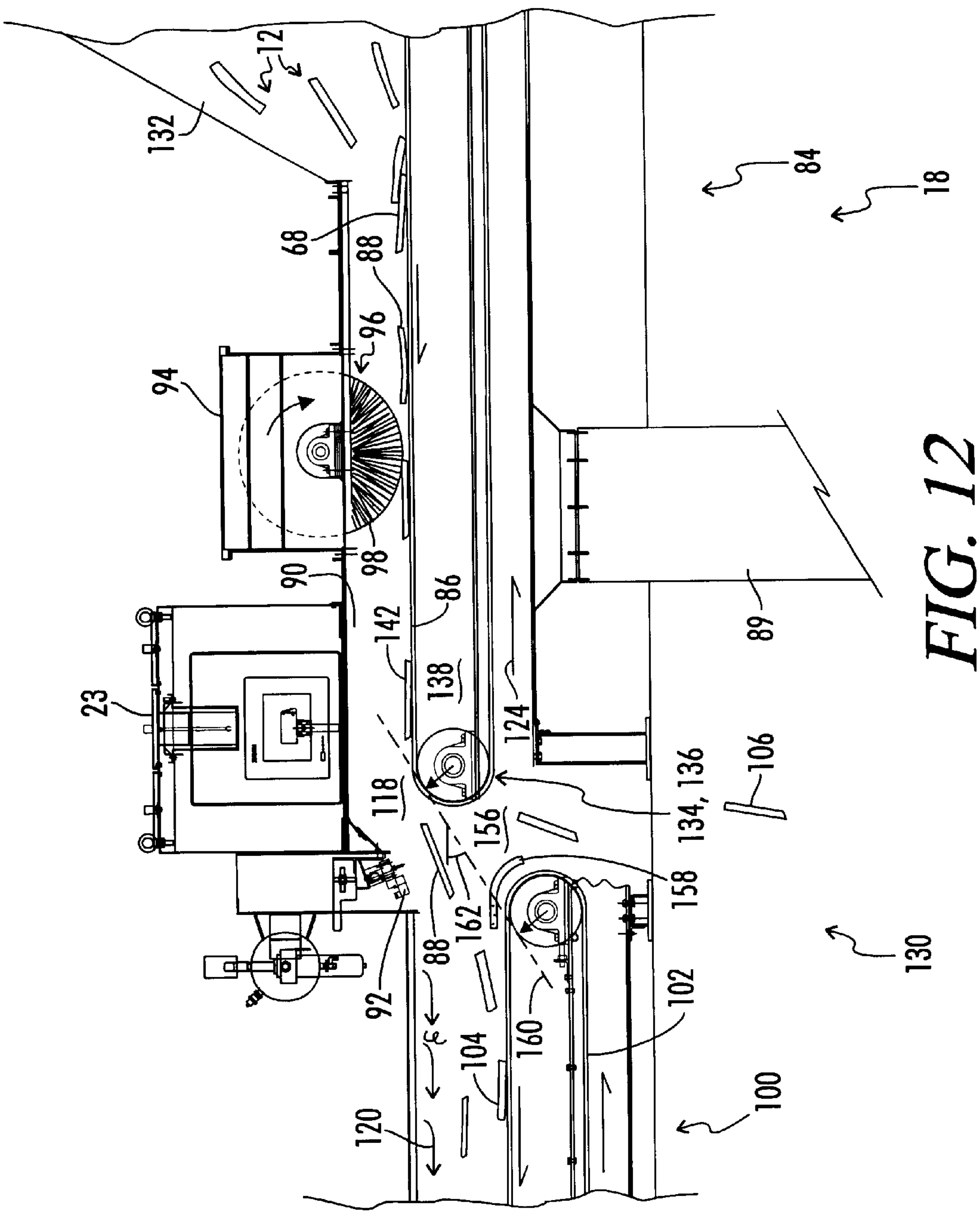
FIG. 12 shows a schematic view of the structure shown in FIG. 10. Paper is shown pinned to the acceleration belt to feed the paper through the sensor at a predetermined speed substantially equal to the belt speed. Targeted paper is shown being ejected from the system and product paper is shown being conveyed away.

FIG. 11 shows an embodiment in which the acceleration conveyor 84 comprises an acceleration belt 86. Referring to FIG. 12, the acceleration belt 86 accelerates the paper 88 to a predetermined speed at which it passes through the sensor 23. The sensor 23 shown in FIG. 12 comprises a light source 90 under which the paper 88 passes. Downstream of the sensor 23 is an ejector 92. Preferably the paper 88 passes through the sensor 23 at the predetermined speed so that the ejector 92 may be operated to eject the selected paper. The velocity at which the paper travels and the distance to the sensor determines when the ejector must emit a burst of air to remove the target paper from the waste stream. In one preferred embodiment the ejector 92 includes a plurality of high compression air jets.

Any paper which adheres to the acceleration belt 86 and carries over the discharge end thereof will be directed to a canvas chute 89 which transfers that material to a waste container (not shown).

The system 10 includes a mechanical pinning means 94 for pinning the paper 88 to the acceleration belt 86. The pinning means 94 is a rotary feeder 96 positioned above and contacting the acceleration belt 86. In some preferred embodiments, the acceleration belt 86 comprises standard PVC material. In some preferred embodiments the rotary feeder 96 is flexible and in contact with the acceleration belt 86. In one embodiment the rotary feeder 96 includes a plurality of flexible bristles 98 extending radially.

FIG. 2 shows a product removal apparatus 100 downstream of the sensor 23. The ejector 92, shown more clearly in FIG. 12, is positioned between the sensor 23 and the product removal apparatus 100.

The product removal apparatus 100 shown in FIG. 12 comprises a product conveyor 102 below and downstream of the acceleration belt 86. Product 104 is carried downstream by the product conveyor 102. The product conveyor 102 will take non-targeted paper (also referred to as product 104) away from the sensing area 118. In some embodiments it will operate at a fixed speed of approximately 600 feet per minute. The conveyor belting may be vulcanized seamless rubber.

Ejected paper 106 (also referred to as targeted paper 106) is ejected by the ejector 92. Preferably the amount of material selected for ejection is smaller than the amount of product going to product conveyor 102. The precision air-jet ejection system may be mounted on the infeed of the product take-away conveyor (also referred to as product conveyor 102). The ejector 92 uses signals received from the sensor 23 to selectively eject targeted materials using an array of high-pressure compressed air nozzles.

Any paper adheres to product conveyor 102 and carries over the discharge end thereof is directed through a drop-out opening to a canvas chute 105 to transfer the waste paper material to a container on the floor.

Figure 13:
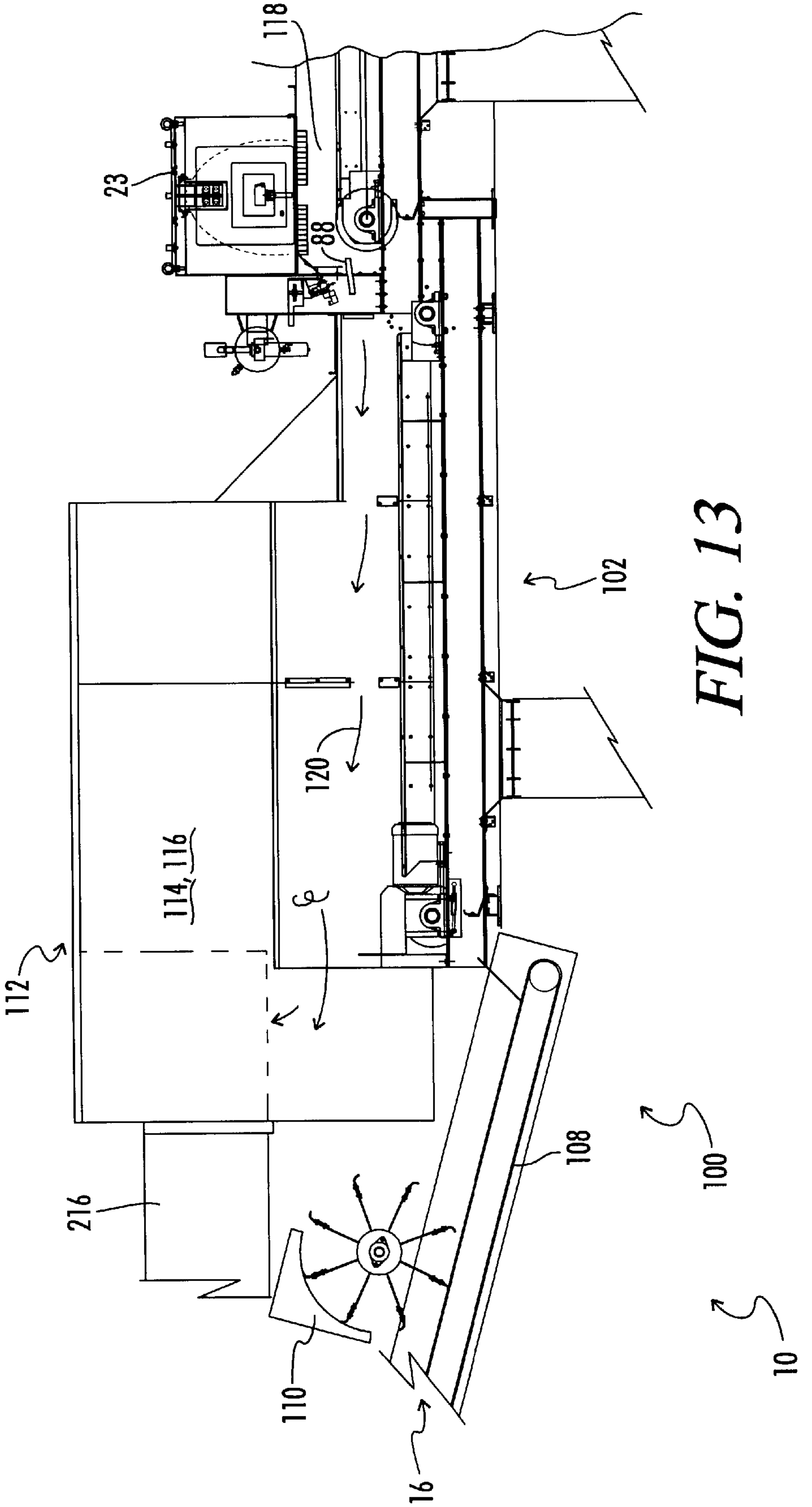
FIG. 13 shows an enlarged view of a product removal apparatus of the paper handler shown in FIG. 1. The product removal apparatus is shown downstream of the sensor and acceleration belt.
Figure 14:
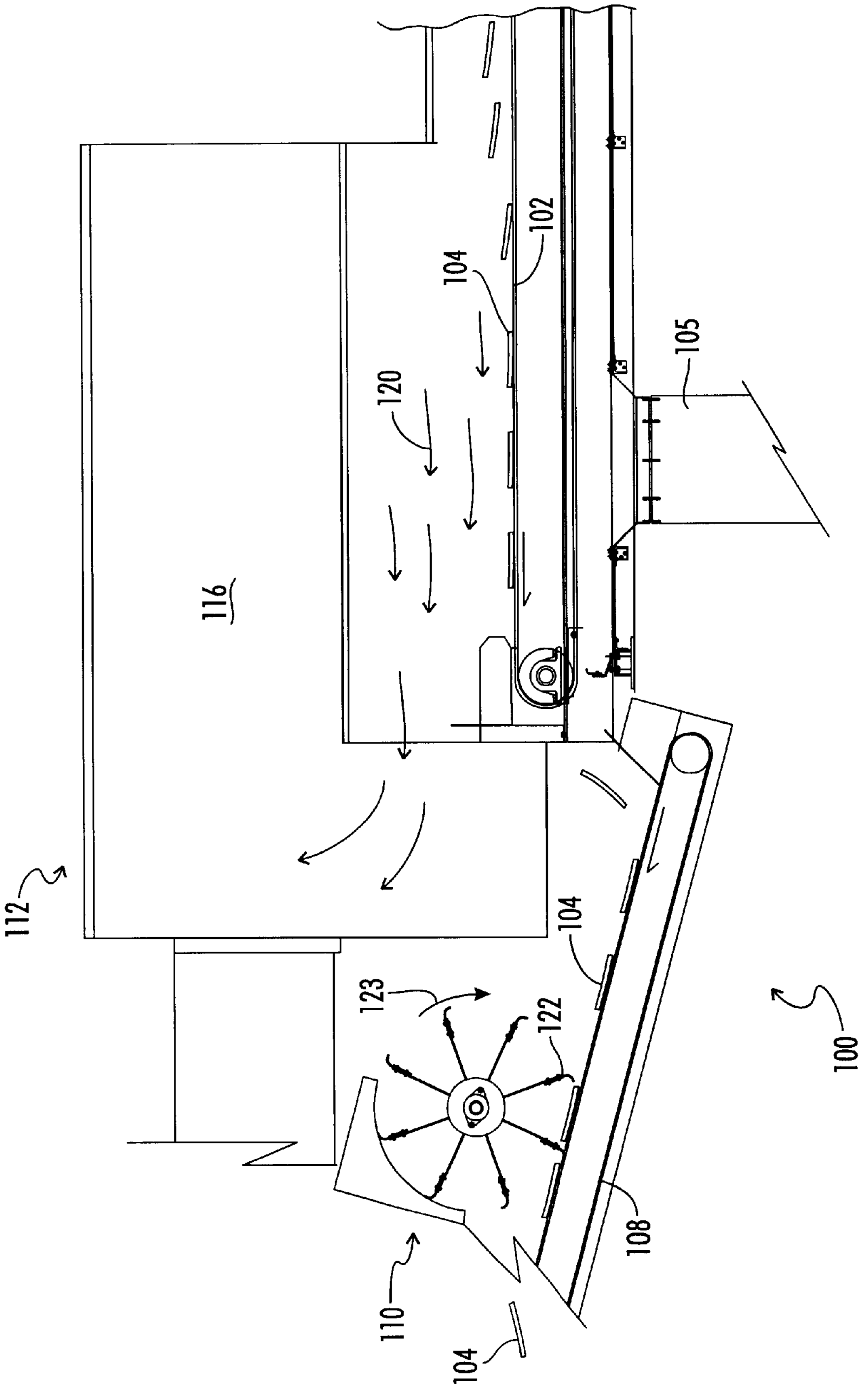
FIG. 14 depicts a schematic view of the product removal apparatus shown in FIG. 13. Paper is shown being pulled through the product removal conveyor and pinned to the product conveyor by an air flow generated by an air-assist means. An airlock including a rotating seal is shown de-entraining product.

FIG. 13 shows an enlarged view of the product removal apparatus 100 shown in FIG. 2. The product removal apparatus 100 shown in FIG. 13 includes a sort conveyor 108 and an airlock 110. The sort conveyor 108 will take the paper fraction that passes through the system without being ejected and deliver it to a baler (not shown). The sort conveyor 108 will be operated in some embodiments at a fixed speed of 100 feet per minute. The sort conveyor 108 includes the product output 16 and the airlock 110. The airlock 110 is proximate the product output 16. The airlock 110 is used to de-entrain paper, or product, 104. The airlock 110 acts as an air seal on the sort conveyor 108 to allow paper 104 to exit while restricting the discharge of air. Rotating tips 122 have a tip speed 123. The tip speed 123 may be fixed, in some embodiments, to match the speed of the sort conveyor 108. In some embodiments the tip speed 123 is 100 ft./min.; and the sort conveyor 108 operates at 100 ft./min. In some applications the airlock 110 may be replaced by a system of rubber flaps.

The acceleration conveyor 84 may also be described as a paper handler 130 (an embodiment of which is shown in FIG. 12) adapted for use with a sorting machine including a sensor 23 for sorting paper. In the embodiment shown in FIG. 12 the handler 130 comprises a paper input 132 for receiving the paper 12. A product output (not shown in FIG. 12) is downstream of the paper input 132. The paper handler 130 also includes a feed accelerator 134 including an acceleration conveyor 136 operably positioned to feed paper 12 (also shown as paper 88) through the sensor 23.

The paper handler 130 may further comprise the plurality of inclined conveyors 50 and 52 positioned upstream of the acceleration conveyor 136, as shown in FIG. 2. In one embodiment of the paper handler 130, the first inclined conveyor 50 includes a belt substantially similar to the belt 70 shown in FIG. 9, operating at a first inclined conveyor speed 54. The paper handler 130 also includes a second inclined conveyor 52 including a belt 55 operating at a second inclined conveyor speed 56. In one preferred embodiment the second inclined conveyor speed 56 is greater than the first inclined conveyor speed 54. The accelerator conveyor 136 operates at an accelerator conveyor speed 124 (also referred to herein as acceleration belt speed) greater than the second inclined conveyor speed 56.

In one preferred embodiment the first inclined conveyor speed is approximately four hundred fifty feet per minute (450 ft./min.); the second inclined conveyor speed is approximately seven hundred fifty feet per minute (750 ft./min.); and the accelerator conveyor speed is approximately twelve hundred feet per minute (1200 ft./min.).

In the embodiment of the paper handler 130 shown in FIG. 2 the first inclined conveyor 50 is operably positioned to receive paper 12 from the spreader 26 which in turn is operably positioned to receive paper 12 from the paper input 14.

Referring to FIGS. 2 and 6, one embodiment of the paper handler 130 comprises rotatable shafts 28 positioned transversely relative to a stream of paper in the spreader 26. The rotatable shafts 42 closer to the first inclined conveyor 50 rotate faster than the rotatable shafts 34 closer to the paper input 14. In FIGS. 3 and 6, the paper input 14 and the first inclined conveyor 50 are not shown. However, the product input 14 would be nearer to the first set of shafts 34, and the first inclined conveyor 50 would be located closer to the third set of rotatable shafts 42.

In some embodiments the acceleration conveyor 136 will include a high-speed belt (operating at approximately 1200 ft./min.) to deliver a thin layer of mixed paper beneath the paper-sort sensor (also referred to herein simply as sensor). The conveyor will have a variable frequency drive and preferably vulcanized seamless belting. Provisions may be incorporated into the design of the belt to minimize carry-over of paper, and ease access for removal of materials which become entrapped. A drop-out chute may be incorporated into the under pan beneath the acceleration conveyor 136 to allow materials which enter beneath the belting to drop free without being moved to the tail section of the conveyor. A small rotary brush may be positioned at the discharge end of the conveyor (proximate air sensor end 138) to assist with discharge of paper. It may be driven from a head-pulley of the acceleration conveyor. A large rotary brush 98 may be mounted on the acceleration conveyor to "pin" paper to the belt prior to entering the sensor area (118). The rotary brush 98 may have a fixed tip speed of approximately 800 feet per minute.

It is desirable to avoid unwanted disturbances to the paper flow by avoiding large speed differentials between the acceleration belt 86, 136 and rotating pinning device 96. This can be accomplished by rotating the pinning device so that the tips of its flexible bristles 98 have a tip speed approximately two-thirds of the speed at which the acceleration belt 86, 136 operates.

The flexible bristles 98 further reduce damage to the rotatable pinning apparatus 96 if bulky materials are carried through by the acceleration belt 86, 136. The flexible bristles 98 can flex to allow the bulky materials to pass.

As previously noted, the speed of the acceleration belt 86 adjacent the sensor 22 may be as high as approximately twelve hundred feet per minute. Such a high speed of the acceleration belt 86 is sufficient to create a suction phenomena such that once paper such as 88 is pinned to the belt 86, such as by means of the rotary pinning device 96, the suction phenomena serves to further pin the paper to the belt so that the paper moves at substantially the same speed as the acceleration belt 86.

As best seen in FIG. 10, at the input end 132 of the paper handler 130 there is located a catching structure 150 including a downwardly inclined catching plate 152 to facilitate delivery of paper to the acceleration belt 86, 136. Paper slides off of catching plate 152 onto acceleration belt 86, 136. The catching structure 150 further includes a plurality of rods such as 154 projecting downwardly in a general direction toward the catching plate 152 and the acceleration belt 86, 136.

Thus, as seen in FIG. 10, paper which is cascading off the end of the second inclined conveyor 52 is directed by rods 154 and catching plate 152 onto the upper surface of the acceleration conveyor 86, 136.

The paper impacts the plurality of rods 154 thus allowing the paper to separate as it falls onto the catching plate 152 and the conveyor belt 86, 136.

As best seen in FIG. 12, when the paper 88 reaches the left hand end or output end of acceleration conveyor 86 after it has passed under the sensor 23, it passes through a transition zone 156. As the paper passes through the transition zone 156 it is still moving at substantially the same speed at which it was travelling on the acceleration conveyor 86, 136. This continued motion is in part assisted by the air flow through the system.

As the paper passes through the transition zone 156, if it has been targeted by the sensor for ejection, a rapid burst of air from ejector 92 will blow the paper downward causing it to become targeted or ejected paper 106. If the paper crossing through transition zone 156 is not impacted by air jets from ejector 92, it will continue to flow generally horizontally and fall downward upon the product conveyor 102.

The transition zone 156 which communicates the acceleration conveyor 86, 136 with the product conveyor 132 can be described as including a separation region adjacent the acceleration conveyor 86, 136 at which the paper separates from the acceleration conveyor 86, 136. The transition zone 156 may also be described as including a reception region adjacent and immediately above the transition plate 158 of product conveyor 102 wherein the product conveyor 102 receives a majority of the paper crossing through the transition zone 156.

The transition zone 156 may also be described with reference to an imaginary transition plane 160 seen in FIG. 12 which extends from the top of the acceleration conveyor 86, 136 and extends to that portion of the product conveyor 102 wherein the top surface thereof becomes generally horizontal and upon which the product paper will fall downstream of the transition plate 158.

The transition plane 160 may be described as lying at an angle 162 relative to the horizontal, where the angle 162 lies in the range of from 15° to 60°. The transition angle 162 is preferably approximately 30°.

The Sensor and Ejector System

The sensor 23 is preferably a linear array of sensors spread across the width of the acceleration belt 86 in a direction normal to the plane of FIG. 12. For example, for a forty-eight inch wide acceleration belt 86, an array of approximately thirty-two sensors spaced across the width of the acceleration belt would be utilized.

The ejector 92 also comprises a linear array of ejectors spaced across the width of the transition zone 156 between acceleration belt 86 and product conveyor 102.

In general the sensors 23 operate to identify bright white paper by searching for fluorescing additives in the individual sheets of paper. This type of paper has a higher value of fluorescence than paper without the additives.

The sensors illuminate the paper with a constant light source having a wave length of 360 nanometers. An elliptical mirror is used to focus light onto a region above the conveyor belt at approximately ten inches from the optic system. When paper with the fluorescing additives is illuminated with the light source, light is re-radiated in the 400 to 550 nanometer range. The sensor has a second light source that emits light in the 480 nanometer range. This light source is used to determine if any type of paper is present on the conveyor belt. It is turned on momentarily every three milliseconds and a reflected light measurement is made to determine if paper is present on the conveyor belt.

The details of construction of the sensor 23 are set forth in U.S. patent application, Ser. No. 09/301,715, of Bruner et al. filed Apr. 29, 1999, entitled "SYSTEM AND METHOD FOR SENSING WHITE PAPER", and assigned to the Assignee of the present invention, the details of which are incorporated herein by reference.

The sensor system 23 will sense whether there is a piece of white paper on the belt 86, and it will sense the location of that paper upon the belt. Since the paper is moving at a predetermined fixed speed, the time at which the paper passes through the transition zone 156 can be calculated by the computer associated with sensor 23. This computerized control system will in turn actuate the appropriate number of the array of jets 92 at the appropriate time so as to blow any reject paper downward through the transition zone 156.

The Air Circulation System

Figure 15:
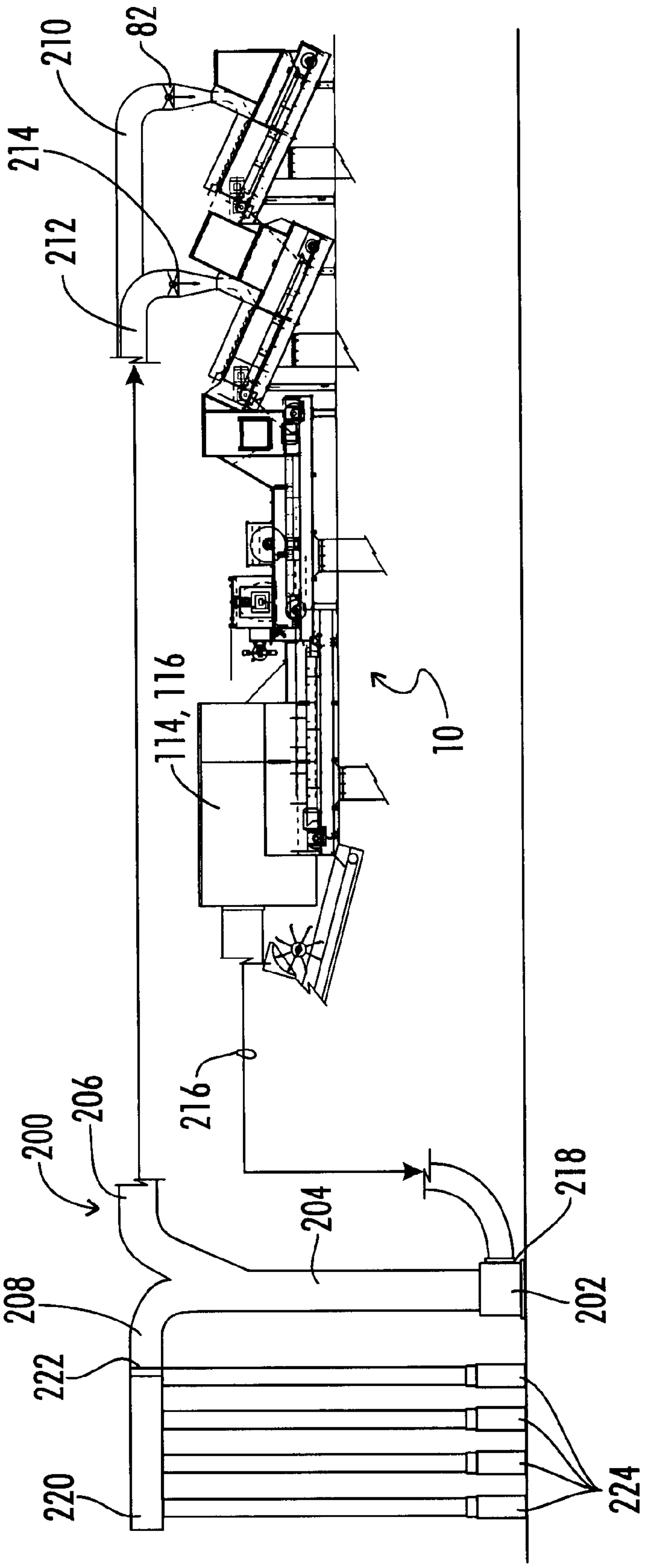
FIG. 15 schematically depicts the air flow system used with the paper sorting system of FIG. 1.

FIG. 15 shows an overall schematic view of an air circulation system 200 of the paper handling system 10. Details of the air circulation system 200 are seen in FIGS. 13, 15, 2 and 9.

With reference to FIG. 15, it can be seen that air is circulated through the system 200 by a blower 202. Pressurized air from blower 202 enters a discharge duct 204 which splits into a supply duct 206 and a filter duct 208.

The supply duct 206 splits into first and second supply duct arms 210 and 212 which are directed to the housings immediately above the first and second inclined conveyor belts 50 and 52.

Air knives 82 and 214 are disposed in the first and second supply duct arms 210 and 212, respectively, adjacent their inlets to the housings surrounding the first and second inclined conveyors 50 and 52, in order to control the flow of air into the housings adjacent the conveyors, and particularly to their louvers such as the louvers 78 associated with first inclined conveyor 50. The first and second supply duct arms 210 and 212 may also include iris-type flow controls adjacent the air knives 82 and 214.

It will be appreciated from the views previously described of the several components, that the inclined conveyors 50 and 52, the acceleration conveyor 84, and the product conveyor 102 all have associated therewith substantially enclosed housings so that the air which is provided through air supply duct arms 210 and 212 to the housings adjacent inclined conveyors 50 and 52 is directed through the housings of conveyors 50 and 52, then through the housings surrounding acceleration conveyor 84 then through the sensing area 118 across the product conveyor 102.

A portion of this air circulation system can be described as an air assist means 112 which is part of the product removal apparatus 100 and which assists in maintaining the predetermined speed of the paper 88 through the sensor 23. In one preferred embodiment the air assist means 112 includes a vacuum 114, which may also be described as a low pressure area 114, downstream of the sensor 23 as is illustrated in FIG. 13.

The vacuum or low pressure area 114 forms within a plenum chamber 116 defined adjacent the left hand end of product conveyor 102 in FIG. 13.

An air recycle duct 216 is connected to the suction inlet 218 of blower 202 in order to pull air from the plenum chamber 116 thus creating the low pressure zone 114 therein. A screen may be utilized adjacent return duct 216 to prevent carry over of paper to the blower 202.

The filter duct 208 leads to a plenum 220 and air flow thereto can be controlled by a motorized damper 222. Plenum 220 is connected to a plurality of filter bags 224. The filter bags 224 are used to remove dust from the air system prior to releasing it to the atmosphere.

In one embodiment, the blower 202 is a 6000 CFM blower, which is a variable speed blower for controlling the speed of the air drawn through the sensor area 118. In a typical system, 2000 CFM would be directed to the filter duct 208, with 4000 CFM flowing through supply duct 206 which in turn splits into two streams of 2000 CFM each in supply duct arms 210 and 212 which are directed to the inclined conveyors 50 and 52.

It is noted that in FIG. 12 the area between the product conveyor 102 and the acceleration belt 86 is shown open at the bottom for clarity. In practice this area will be closed in order to facilitate control of air flow through the system.

The air circulating through the system illustrated in FIG. 15 provides several functions.

When the air first flows in through the louvers such as 78 of the first and second inclined conveyors 50 and 52, that air flow functions to help pin the paper onto the inclined conveyors so as to help accelerate the paper speed up to the conveyor speed.

The air also aids in fluffing the paper as it cascades off the ends of the inclined conveyors.

The air also assists in the downstream movement of the paper through the system.

Particularly, the air assists in the movement of the paper through the sensing area 118 across the gap between acceleration belt 86 and product belt 102.

The plenum chamber 116 adjacent the downstream end of the product conveyor 102 may be utilized to reduce the air flow to a speed below two hundred feet per minute in order to allow the paper to settle out on the product conveyor 102.

The housing which defines the plenum 116 has a much larger area at plenum 116 than it does upstream near the transition zone 156, so that the air speed is much higher near the transition zone 156 than it is downstream adjacent the plenum 116.

The right hand end of the product conveyor 102 may generally be described as a transition end thereof. A transition plate 158 is located immediately above the transition end of the product conveyor 102. The transition plate 158 is curved to conform to the general shape of the curved end of the product conveyor 102, and functions to prevent paper from falling back off the transition end of the product conveyor.

Methods

The present invention also includes various methods for handling paper. One method comprises the steps of distributing clumps of paper 140 (see FIG. 2) into operably thin layers of paper 142 (see FIG. 12). Operably thin is defined to be thin enough to accomplish the goal for which the paper is being handled. In one preferred embodiment the goal is to sense the paper by passing it through a sensor. To accomplish this goal the paper should be thin enough that the sensor may adequately sense and distinguish pieces of paper. The paper may then be sorted by an ejector. The method of handling paper also comprises accelerating the paper. The step of accelerating the paper includes progressively increasing the speed at which the paper is transported downstream.

One embodiment of this method comprises the steps of breaking up clumps of paper 42 in a spreader 26. An apparatus for accomplishing this is shown in FIG. 6. The method may also comprise rotating rotatable shafts 28 in the spreader 26 to progressively increase the speed at which the paper travels. The paper is also generally referred to herein by designation 12. Another method of the invention comprises the step of feeding the paper 12 into a plurality of inclined conveyors 50 and 52. This is shown in FIGS. 2 and 9. The respective plurality of inclined conveyor belts catch underlying layers of paper 68. The underlying layers of paper 68 are also referred to as bottom layers of paper 68. The method includes accelerating the underlying layers of paper 68 up to speeds approximating speeds at which the respective plurality of inclined conveyor belts operate.

One preferred embodiment of the invention comprises the step of inclining the inclined conveyors between fifteen degrees and thirty-five degrees (15°–35°). This is the optimal range for paper to adhere to and travel up the conveyor while paper on the top slides off the bottom paper due to gravity. Generally, layers of paper will begin to slide over lower layers of paper due to gravity at an incline of 15°. Beyond 35° the paper will not adhere to the belt as easily. This takes advantage of paper's friction co-efficient. The method includes allowing paper 66 above the underlying layers 68 to slide down the incline and become new underlying layers. A new underlying layer 144 is shown in FIG. 9. The method then includes catching the new underlying layers 144 with the respective plurality of inclined conveyor belts and accelerating the new underlying layers 144 of paper 12 up to speeds approximating the speeds at which the respective plurality of inclined conveyor belts operate.

In some embodiments the method comprises the step of pinning the underlying layers of paper 68 to the respective plurality of inclined belts with air 76 and 126. This is shown in FIG. 9 in which air-assist means 74 pins and fluffs the paper 12. Accordingly, one method comprises the step of fluffing the paper 12 as it cascades off respective ends of the respective plurality of inclined conveyors. In FIG. 9 one respective end is designated 146 on inclined conveyor 50.

It is desirable to adjust volumes of air flow 76 with air knives 82 and direct air 76 (also shown as direction of air 126) with respective sets of louvers 78 in the inclined conveyors 50 and 52.

Preferably inclined conveyors downstream are operated at higher speeds than inclined conveyors upstream. Referring to FIGS. 2 and 12, it will be apparent that the present invention also includes the method of catching underlying layers of paper 68 on an acceleration belt 86. The underlying paper 68 is accelerated to a predetermined speed. The paper (referred to in FIG. 12 by designation number 88) is allowed to pass through a sensor 23 at the predetermined speed.

In one preferred embodiment a rotary feeder 96 is rotated above the acceleration belt 86 to pin the paper 88 to the acceleration belt 86. The method also includes contacting the paper 88 and pinning the paper 88 to the acceleration belt 86 as the paper 88 passes between the acceleration belt 86 and the rotary feeder 96. Preferably damage to the rotary feeder 96 is prevented by allowing the rotary feeder 96 to flex. In some embodiments the rotary feeder operates at a speed less than the acceleration belt 86. In one embodiment the rotary feeder rotates at speeds of eight hundred feet per minute (800 ft./min.) and the acceleration belt operates at speeds approximating twelve hundred feet per minute (1200 ft./min.). More generally, a preferred embodiment in the present invention includes the step of rotating the rotary feeder 96 at approximately two-thirds of the speed at which the acceleration belt 86 operates. This prevents the pinning device from being bent up by a large speed differential when the pinning device contacts the high velocity acceleration belt 86. This also reduces the likelihood that the paper 88 will be turned up at its end as it is caught between a stationary pinning device and a high velocity belt.

Another method of the present invention comprises the steps of allowing the paper 88 to pass through a sensor 23 and ejecting paper 106 (also referred to as targeted paper) selected for ejection (See FIG. 12). The method also includes allowing non-selected paper, also referred to herein as product, 104 to continue downstream to a product conveyor 102. Preferably the predetermined speed of the paper 88 is maintained through the sensor 23 with air-assistance 112 (not shown in FIG. 12).

Another embodiment of handling paper comprises drawing the paper 88 with a vacuum 114 downstream of the ejector 92, and matching a vacuum speed at which the vacuum 112 draws to a belt speed at which the acceleration belt 86 operates. The acceleration belt 86 accelerates paper 88 through the sensor 23 at a sensor speed (not shown) substantially equal to the acceleration belt speed 124 at which the acceleration belt 86 operates. Sensor speed as used here refers to the rate at which the sensor may sense material passing through it.

In some embodiments the method comprises the steps of adhering the paper 104 to the product conveyor belt 102 with the vacuum 114.

Other methods of the invention comprise spreading and accelerating the paper in a spreader 26, and transporting and accelerating the paper 12 up a first inclined conveyor 50. The paper 12 is accelerated with the first inclined conveyor. The method also includes transporting and accelerating the paper 12 up a second inclined conveyor 52 and then accelerating the paper through a sensor 23 at a predetermined feed. In some embodiments the paper is pinned with a rotary feeder 96 proximate the sensor 23. It is desirable in some embodiments to maintain paper flow through the sensor 23 with a vacuum 114. The method also comprises ejecting selected paper 106.

Thus, although there have been described particular embodiments of the present invention of a new and useful ACCELERATION CONVEYOR, it is not intended that such references be construed as limitations upon the scope of this invention except as set forth in the following claims.

What is claimed is:

1. A paper handler for handling sheets of paper comprising:

an acceleration conveyor including an acceleration belt operating at an acceleration speed, the acceleration belt having a width greater that a maximum dimension of the sheets of paper to be handled; and a pinning structure operably positioned to pin paper to the acceleration belt, the pinning structure including a rotary feeder having a plurality of flexible bristles extending radially from a roller.

2. The paper handler of claim 1, wherein the rotary feeder is contacting the acceleration belt.

3. The paper handler of claim 1, wherein the rotary feeder has an outer surface rotating at a rotary surface speed, and wherein the rotary surface speed is less than the acceleration speed.

4. The paper handler of claim 3, wherein the rotary surface speed is approximately two-thirds of the acceleration speed.

5. The paper handler of claim 4, wherein the acceleration speed is approximately 1200 ft./min.

6. The paper handler of claim 1, wherein the acceleration speed is sufficiently high to create a suction phenomena such that when paper is pinned to the acceleration belt the paper will be accelerated to a paper speed substantially equal to the acceleration speed.

7. The paper handler of claim 6, wherein the acceleration speed is at least 800 ft./min.

8. The paper handler of claim 7, wherein the acceleration speed is approximately 1200 ft./min.

9. The paper handler of claim 1, wherein the acceleration speed is at least 1000 ft./min.

* * * * *